US006955447B2

(12) United States Patent
Lui

(10) Patent No.: US 6,955,447 B2
(45) Date of Patent: Oct. 18, 2005

(54) REMOTE CONTROL ASSEMBLY COMPRISING A SIGNAL LIGHT AND A SPOTLIGHT

(75) Inventor: Thomas Kim Fung Lui, Yau Tong Bay (HK)

(73) Assignee: Yuk Fat Company Ltd., Kln. (HK)

( * ) Notice: Subject to any disclaimer, the term of this patent is extended or adjusted under 35 U.S.C. 154(b) by 146 days.

(21) Appl. No.: 10/652,310

(22) Filed: Sep. 2, 2003

(65) Prior Publication Data

US 2005/0047142 A1     Mar. 3, 2005

(51) Int. Cl.[7] .................. F21V 21/30; F21V 21/092
(52) U.S. Cl. .................. 362/233; 362/35; 362/228; 362/272; 362/275; 362/287; 362/397; 362/428
(58) Field of Search .................. 362/35, 228, 233, 362/250, 269, 271, 272, 275, 285–287, 418, 362/419, 422–426, 428, 268, 397

(56) References Cited

U.S. PATENT DOCUMENTS 4,353,110 A * 10/1982 Ellis .................. 362/35
5,490,046 A    2/1996 Gohl et al. .................. 362/35
5,499,167 A *  3/1996 Brown .................. 362/35
5,584,560 A * 12/1996 Gosswiller et al. .................. 362/286
5,590,955 A *  1/1997 Bornhorst et al. .................. 362/324
6,655,817 B2 * 12/2003 Devlin et al. .................. 362/233

* cited by examiner

Primary Examiner—Alan Cariaso
(74) Attorney, Agent, or Firm—Rabin & Berdo, P.C.

(57) ABSTRACT

A remote control assembly comprising a signal light and a spotlight comprises a lamp receptacle, a combined light, two driving device for the combined light, a base stand, circuit board and suction disk. The combined light includes signal light and spotlight, lamp shields, lens and supporting shafts. When assembled, it is rotatably mounted in the lamp receptacle. One of driving device can make the combined light rotate upward and downward in the range of 250°, and can provide large visual angle in the evening or at night, even beyond 90°, and the other driving device can make the combined light rotate horizontally in the wide range of 360°. In addition, it (the combined light) has good performance of weather proof and super bright illumination. In emergency condition, its flashing light can be seen from several kilometers away. It is suitable for use on deck, galley, trailers and utility vehicles.

13 Claims, 3 Drawing Sheets

REMOTE CONTROL ASSEMBLY COMPRISING A SIGNAL LIGHT AND A SPOTLIGHT

FIELD OF INVENTION

The present invention relates to an assembly comprising an illumination and signalling apparatus, particularly relates to a remote control type combined signal light and spotlight.

BACKGROUND OF THE INVENTION

In the U.S. Pat. No. 5,490,046, a portable remote-controlled searchlight apparatus is disclosed. The apparatus includes a lamp unit, a lamp housing, a base support member, remote control unit and a releasable attachment to mount and demount the base support member to another surface, such as on the roof of a motor vehicle. The searchlight apparatus or lamp unit can be rotated upward and downward or left and right side by means of remote control unit mounted within the vehicle. The left and right side rotation of the searchlight apparatus or the lamp unit is realized by the engagement of an inner gear disk and an outer gear separately mounted between the lamp housing and the base support member, while the upward and downward rotation is realized by mounting the lamp unit of the searchlight apparatus in a rotatable manner on the lamp housing, and vertically mounting a gear rack on the rear portion of the lamp unit and mounting a gear wheel in the lamp housing, and making said gear rack and said gear wheel mesh each with other so that the lamp unit can rotate with respect to the lamp housing. Such rotation transmission structure suffers from the complexity of gear processing, mounting and sealing and the requirement for higher power motor, in addition the upward and downward rotation angle with which the lamp unit rotates around the base support member or around the supporting shaft is limited by the gear rack type transmission, it is believed that the rotation angle cannot exceed ±45°. Furthermore, in the prior art, the illumination and the signalling apparatuses are generally designed independently and separately, they have not been integrated into one body, thereby inconvenience arises in use in some cases.

SUMMARY OF THE INVENTION

The purpose of the present invention is to provide a kind of combined light. More specifically, it relates to provide a remote control combined signal light and spotlight which are combined for use and which can provide a supper wide range of rotation angle.

The other purpose of the present invention is to provide a remote control combined signal light and spotlight which is weather proof and can provide stronger flash light and illumination.

The technical scheme to realize the above purposes is: a kind of remote control combined signal and spotlight, it comprises:

a lamp receptacle including a base portion and two supporting portions mounted vertically on the bottom of the base portion, the supporting portions are hollow pillars and the upper portions thereof are provided with a shaft hole respectively;

a combined light including a signal light, a spotlight, a front lamp shield, a rear lamp shield, a lens, a circuit board for signal light and two supporting shafts, among them, the front portion of the front lamp shield and the rear portion of the rear lamp shield are provided with an opening respectively, in the openings are mounted the lens and the spotlight, behind the lens are provided the signal light and the circuit board and the front lamp shield and the rear lamp shield can form an approximately spherical lamp body or light body by means of fasteners, the two supporting shafts are fixed axial symmetrically on spherical lamp body faces adjacent to the abutted faces of the front lamp shield and the rear lamp shield and have a common axis, in addition, the combined light can be rotatably mounted on the lamp receptacle by the two supporting shafts;

a driving device for the upward and downward rotation of the combined light including a driven gear mounted on one of the two supporting shafts of the combined light and located within the supporting portions, a first drive mechanism mounted on the supporting portions, which is mounted on the inner wall of the supporting portions and can connect and drive the driven gear to make it rotate;

a base stand having a shape similar to an inverted bowl, on the central position thereof is provided a circular protruding platform, on the peripheral face of its middle portion are provided a small hole and a supporting hole at the radial opposite positions;

a driving device for the horizontal rotation of the combined light including an outer gear, a second worm, a second motor and a base disk, among them, in the base disk, a hollow round tube portion extending upward from the bottom of the base disk is provided and the base disk is able to be rotatably fitted onto the protruding platform of the base stand via the tube hole of the round tube portion, the outer gear is fixed on the end face of the protruding platform of the base stand, the motor is mounted in the installation portion of the bottom portion of the base disk and a second worm is fixed on its driving shaft, and at the same time, the second worm and the outer gear can mesh together;

receiving and controlling circuit boards are respectively mounted in the lamp receptacle and the base disk, and a suction disk device is mounted under the base stand.

In the above remote control combined signal light and spotlight, said first drive mechanism includes a housing, a first gear, a last stage gear, several intermediate transmission gears, a first worm and a first motor, among them, the housing is composed of two channel-section shaped parts jointed by facing each other and formed into a hollow chamber between them, on the upper portion of the inner wall of the housing are provided several shaft holes to be used as supporting holes for mounting the above mentioned gears in place through gear shaft, while the first motor is mounted on the lower portion of the inner wall, the first worm is fixed on the drive shaft of the first motor and disposed in such a manner that it can mesh with the first gear, while the last stage gear meshes with the driven gear of the supporting shaft of the combined light, and the intermediate transmission gears mesh with the first gear and the last stage gear.

In the above described remote control combined signal and spotlight, the number of the gears of the first drive mechanism is four, except for the first gear and the last stage gear, the intermediate gears are double linked gears composed of a large gear and a small gear, the small gear is arranged to mesh with the last stage gear, while the large gear meshes with the first gear.

In the above-mentioned remote control combined signal light and spotlight, the driving device for the upward and downward rotation of the combined light further includes a control mechanism for allowing the combined light to rotate upward and downward in a reciprocating manner, said control mechanism includes an elongated positioning operation rod which is pivotally mounted on the outer wall of the housing, and two miniature limit switches or miniature switches mounted on the housing with a predetermined interval and a certain angle of inclination between each other and an up-down actuating means which can allow the lower portion of the positioning operation rod to swing periodically to make contact with the contacts of the two miniature switches and which can make the first motor rotate upward and downward periodically in forward and reverse direction.

In the above described remote control combined signal light and spotlight, said up-down actuating means includes a radial ledge disposed on the lateral plane of the first gear and a protruding pillar disposed on an upper rod face of the positioning operation rod, the protruding pillar can insert into the housing through the opening provided on the housing and can act with the ledge of the first gear to push the positioning operation rod to rotate pivotally thereby making the lower portion of the positioning operation rod swing in a reciprocating manner and make contact periodically with the contacts of the two miniature switches.

It can be seen form the above, due to the fact that the remote control combined signal light and spotlight adopts a combined light which can be formed into a ball like shape, and a driving device for upward and downward rotation composed of driven gear mounted on the two supporting shafts of the combined light and a first drive mechanism which is mounted in the lamp receptacle supporting portion and which can make the driven gear rotate as well as a driving device for horizontal rotation of the combined light mounted on the base portion, the combined lights can rotate upward and downward in a range of 250°, and can rotate left to right in a super wide range of 360°, and can provide a large visual angle, even more than 90° in the evening or at night. In addition, the combined light adopts super bright sealed light beam bulb and super bright xenon flash bulb, in the case of emergency, the flash light can be seen from several kilometers. The combined light, not only has the good sealing performance, but also is of a good weather proof design. The structure of the combined light makes the signal light and the spotlight being able to work simultaneously or work independently, moreover the combined light can be used outdoor such as on deck, galley, trailers and various utility vehicles, and the suction disk of the equipment can provide powerful holding function.

DETAILED DESCRIPTION OF PREFERRED EMBODIMENT

Figure 1:
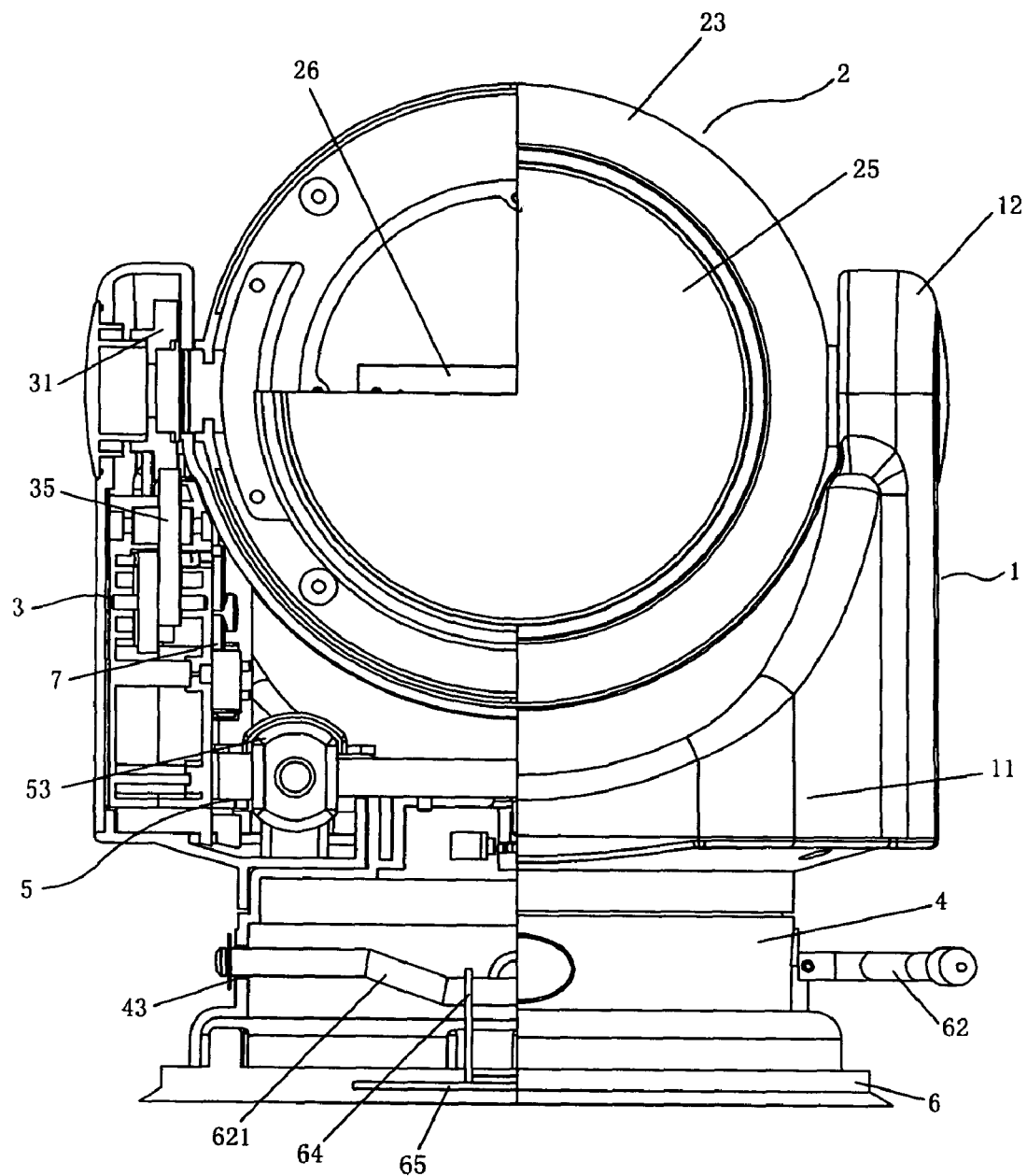
FIG. 1 is a prospective exploded view of the components of the remote control combined signal light and spotlight of the present invention.
Figure 2:
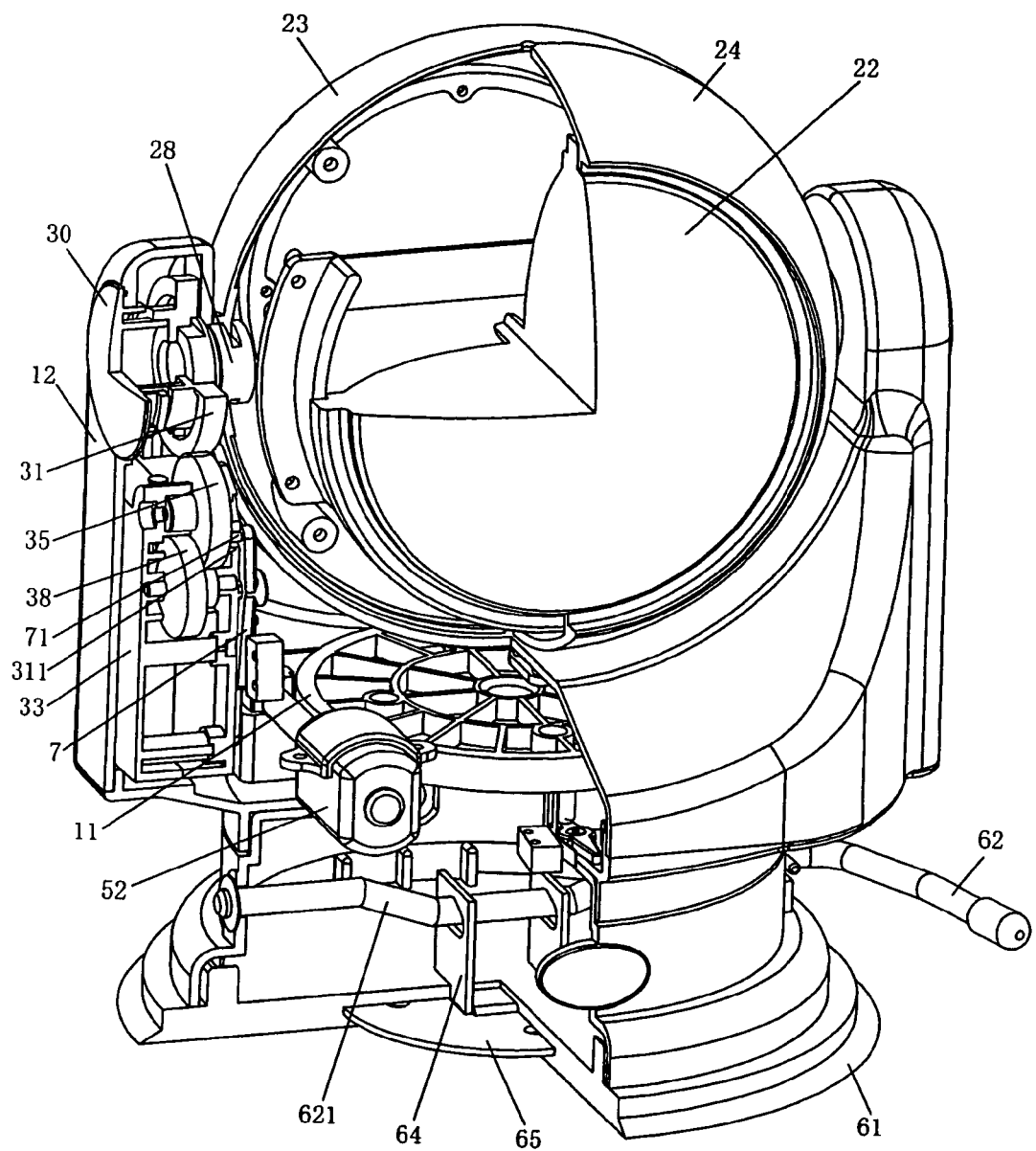
FIG. 2 is a partial sectional perspective view of the embodiment of the remote control combined signal light and spotlight.
Figure 3:
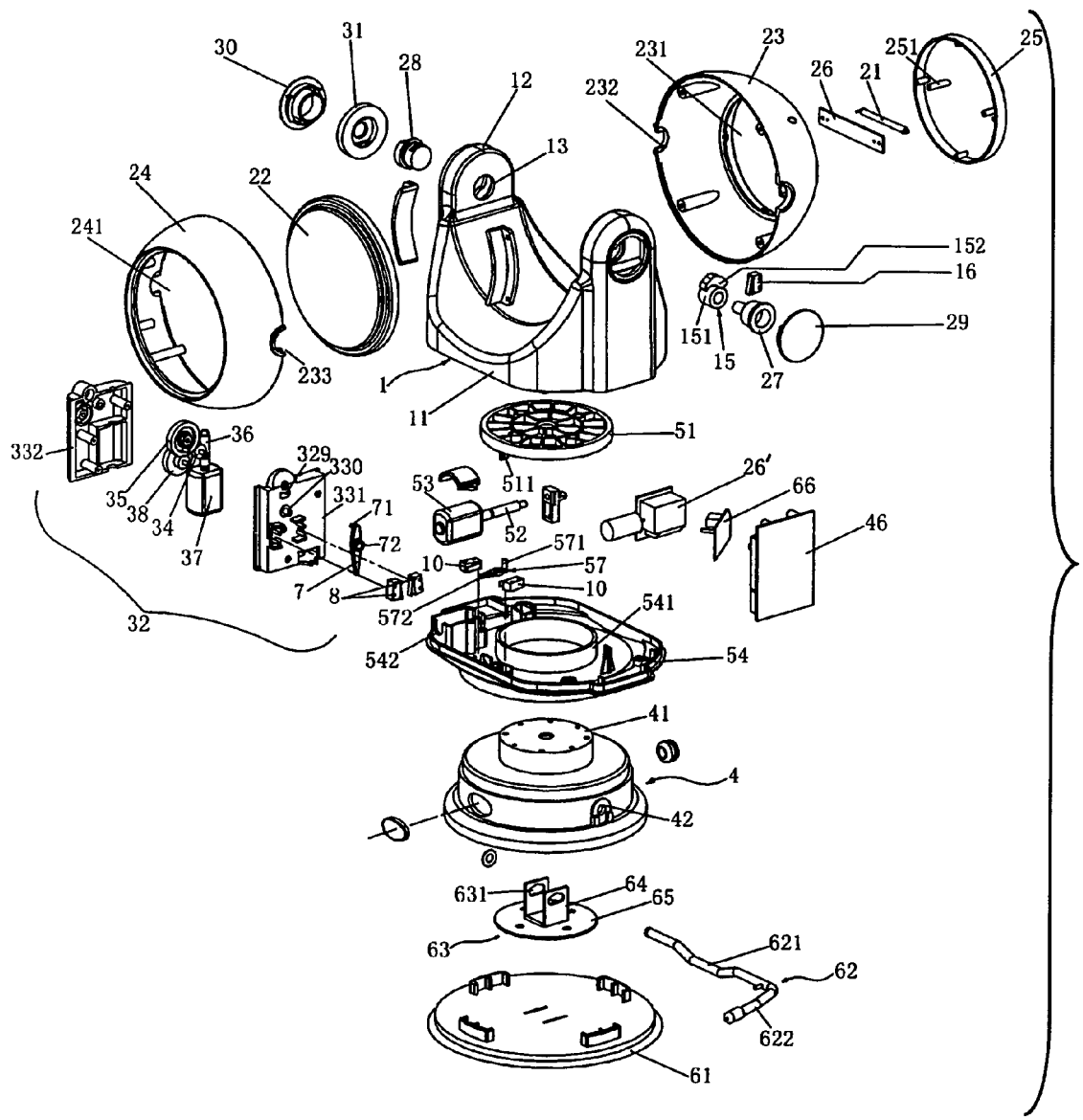
FIG. 3 is a partial sectional plane view of the remote control combined signal light and spotlight shown in FIG. 2.

Referring to FIG. 1 to FIG. 3, the remote control type combined signal light and spotlight includes a lamp receptacle 1, a combined light 2, a driving device 3 for the upward and downward rotation of the combined light 2, a base stand 4, a driving device 5 for the horizontal rotation of the combined light 2, a suction disk device 6 and several receiving and controlling circuit boards. Among them, the lamp receptacle 1 includes a base portion 11 and two supporting portions 12 disposed at two sides of the base portion 11. The supporting portions 12 are perpendicular relative to the plane where the bottom of the base portion 11 is positioned. In addition, the supporting portions 12 are hollow pillars or columns, a shaft hole 13 is provided each on the upper portion thereof. The shaft holes 13 can be of step shape.

The combined light 2 comprises a signal light 21, a spotlight 22, a front lamp shield 23, a rear lamp shield 24, a lens 25, a signal light circuit board 26 and two supporting shafts 27,28. The signal light 21 can adopt straight tube type super bright xenon flash light bulb, the spotlight 22 can adopt a super bright sealed light beam bulb with ball-shaped curved light face.

The front lamp shield 23 and the rear lamp shield 24 are both semi-ball or semi-spherical shields. An opening 231, 241 is provided respectively on the middle portion of the lamp shield 23,24. The lens 25 has also a ball-shaped curved surface which can be made of organic glass or glass. On the inner face of the lens 25 are provided two short and small rods 251 which are integrated into one body with the inner face, a flash light circuit board 26 can be mounted on the short and small rods 251. The signal light 21 can be mounted on the circuit board 26. The spotlight 22 and the lens 25 equipped with the circuit board 26 and the signal light 21 can be mounted respectively in the front lamp shield 23 and the rear lamp shield 24 by means of threaded connection each to other and the light face of the spotlight 22 and the surface of the lens 25 are to be formed into two approximately semi-ball or semi-spherical faces in a complementary manner with the openings 231 and 241 of the lamp shield 23, 24. The front lamp shield 23 and the rear lamp shield 24 can be assembled together with fasteners and formed into a spherical lamp body, so that the combined light of the present invention can be tightly fixed and can have good sealing performance which is advantageous as compared with prior art illumination lights.

The two supporting shafts 27, 28 are respectively axial symmetrically fixed on the spherical faces adjacent the abutted faces of the front lamp shield 23 and the rear lamp shield 24 and have a common axis. Moreover the combined light can be mounted rotatably on the lamp receptacle I by means of two supporting shafts 27,28.

In the preferred embodiment, at the opposite sides of the front lamp shield 23 and the rear lamp shield 24 are each provided two semi-circular recess grooves 232,233, after the front lamp shield 23 and the rear lamp shield 24 are assembled together, two pairs of semi-circular recesses 232,233 can form two round mounting holes in which two supporting shafts 27,28 can be inserted and fixed. In this way, the combined light 2 can be mounted rotatably on the supporting portions 12 of the lamp receptacle 1 by means of the two supporting shafts 27,28. In order to make the combined light 2 rotate more better and to protect the supporting shafts 27,28 against wind and rain, ball-bearings can be provided for the supporting portions 12 of the lamp receptacle 1 and a cover 29,30 can be used to close the hole ports end of the shaft holes 13 so that the lamp receptacle I can be sealed more better.

The driving device 3 for the upward and downward rotation of the combine light 2 includes a driven gear 31 which is mounted on one of the two supporting shaft 27,28 of the combined light 2. For example, in this embodiment, the driven gear is mounted on the supporting shaft 28 and located in the hollow body or hollow pillar of the supporting portion 12, and a first drive mechanism 32 which is mounted in the hollow pillar of the lower portion of the supporting portion 12 under the driven gear 31 or in the base portion 11 and can connect and actuate the driven gear 31 to make it rotate. The first drive mechanism 32 includes a housing 33, a first gear 34, a last stage gear 35, intermediate gear(s), a first worm 36 and a first motor 37. Among them, the housing 33 is formed by two channel-section shaped parts 331,332 face to face oppositely joined together. Several shaft holes can be provided on the upper portion of the two opposite inner walls of the housing 33 to be used as supporting holes for mounting the gear shaft of the above mentioned gears and the opening 329,330 are disposed on one of the inner walls of the housing 33 in a vertical alignment manner. In the housing 33, a first motor 37 is mounted on the lower portion of the housing, a first worm 36 is made to mesh with the first gear 34, while the last stage gear 35 meshes with driven gear 31 on one of the supporting shafts 27,28 of the combined light 2, and the intermediate gears mesh with the first gear 34 and the last stage gear 35. Then, after the first motor 37 is started, the transmission between the worm of the first drive mechanism 32 and the gears (36,34,35,38) makes the driven gear rotate and thereby the combined light 2 can be rotated. The range of the angle of the upward and downward rotation of the combined light 2 can be adjusted through the external control circuit which controls the first motor 37.

Preferably, the number of the gears of the first drive mechanism is four, except for the first gear 34 and the last stage gear 35, the intermediate gears are double-linked gears composed of a large gear and a small gear, among them, the small gear is arranged to mesh with the last stage gear 35, while the large gear meshes with the first gear 34.

In order to make the angle of upward and downward rotation being able to be controlled(adjusted) automatically, in a preferred embodiment, the driving device 3 for the upward and downward rotation of the combined light 2 includes further a control mechanism which can make the combined light 2 being able to rotate in reverse direction or to rotate upward and downward in a reciprocating manner. The control mechanism includes a positioning operation rod 7 having a pin shaft 72 in the middle portion at one side of the positioning operation rod 7 and the rod 7 is mounted pivotably on the housing 33 through the matching of the pin shaft 72 with the opening 330 of the housing 33, two relay type limit miniature switches 8 mounted on the housing 33 with a predetermined interval and a predetermined angle of inclination between each other, and an actuating means for upward and downward rotation which can allow the lower portion of the positioning operation rod 7 to make contact with the contacts of the two miniature switches 8 in a periodical manner to make the first motor 37 rotate upwards and downwards in forward and reverse directions when the positioning operation rod is swinging.

This actuating means for upward and downward rotation includes a radial ledge 311 disposed on the lateral plane of the first gear 34 and a small protruding pillar 71 disposed on the upper portion rod face of the positioning rod 7. The small protruding pillar 71 can be inserted into the housing through the opening 329 on the housing 33 and make contact instantaneously with the ledge 311 of the first gear 34 to push the positioning operation rod 7 to make pivoting rotation and to make the contact of one of the miniature switches 8 close and thereby to change the original rotation direction from the clockwise or counter clockwise direction to counter clockwise or clockwise direction. Correspondingly, if the positioning operation rod is pushed to make pivoting rotation and the other contact of the miniature switch 8 is pushed to close, the reverse direction change will occur. When the reciprocating rotation of the first motor 37 actuates the combined light 2 to make upward and downward rotation of the combined light, the range of upward and downward rotation angle can be as wide as 250° (illumination angle being 195°).

Preferably, the driving device 3 for the upward and downward rotation of the combined light 2 includes further a automatic extinguishing mechanism for the spotlight 22. The extinguishing mechanism is composed of the actuating member 15 mounted on the supporting shaft 27 and switch 16 which is mounted on the inner wall of the supporting portion 12 and which can make contact instantaneously with the actuating member 15. The actuating member 15 includes a round sleeve 151 and a protruding portion 152 disposed on the outer peripheral face of the round sleeve 151. The actuating member 15 is placed over (fitted onto) the supporting shaft 27 via the sleeve hole of the round sleeve 151 and rotates together with the supporting shaft 27 when it rotates to the position where the spotlight 22 of the combined light 2 faces downward and forms a predetermined angle with the horizontal plane, the protruding portion 152 makes contact with the contact of the switch 16 to automatically extinguish the spotlight 22. The automatic distinction occurs, because when the spotlight 22 rotates to the above mentioned predetermined angle (generally downward 35° or more), such angle is just the angle at which the spotlight 22 illuminates directly on the lamp receptacle 1. The enormous heat from its illumination would damage the lamp receptacle 1.

The shape of the base stand 4 is similar to an inverted bowl. There is a protruding round platform 41 at its central position, on the peripheral face of its middle portion are provided a small hole 42, a supporting hole 43 and a mounting hole for mounting the cable (not shown in FIGS.) at the radically opposite positions. The lamp receptacle 1 can be positioned over the base stand 4 by means of a support disk. These and other functions of the base stand 4 will be described later in details.

The driving device 5 for horizontal rotation of the combined light 2 includes an outer gear 51, a second worm 52, a second motor 53, and a base disk 54. Among them, the base disk 54 has a hollow round tube portion 541 extending upward from its bottom and through the tube hole of the round tube 541, the base disk 54 can be fitted rotatably onto the protruding round platform 41 of the base stand 4. The outer gear 51 is fixed on the platform face of the platform 41 by means of fasteners. The second motor 53 is mounted on the mounting portion 542 of the bottom portion of the base disk 54. The drive shaft of the second motor 53 is fitted with the second worm 52 and the second worm 52 is arranged to mesh with the outer gear 51. In this way, after the second motor is stared, the second worm 52 rotates, and due to the fact that the outer gear 51 is fixed on the base stand 4, in the transmission by the engagement of the second worm 52 with the outer gear 51, the outer gear 51 is immobile, therefore only the second worm 52 rotates with respect to the outer gear 51, which makes the base disk 54 and the lamp receptacle 1 fixed on the base disk 54 rotate together and the combined light 2 of the lamp receptacle 1 rotates at the same time.

The driving device 5 for the horizontal rotation of the combined light 2 generally further includes a control mechanism which can make the combined light 2 rotate in 360° in a reversible manner. The control mechanism includes two miniature switches 10 mounted with a predetermined interval (space) and a predetermined angle of inclination each to other on the bottom portion of the base disk 54 and positioned close to the outer gear 51, a positioning operation rod 57 mounted pivotally on the bottom portion of the base disk 54 and positioned between the miniature switches 10 and a horizontal actuating means can make the lower portion of the operation rod 57 swing periodically and to make contact with the contacts of the miniature switches 10 and can make the second motor 53 to rotate periodically in positive and reverse direction.

The horizontal actuating means includes a radial ledge 511 disposed below the gear face of the outer gear 51 and a protruding pillar 571 disposed on the upper portion rod face of the positioning operation rod 57, said protruding pillar 571 can act with the ledge 511 of the outer gear 51 to push the positioning operation rod 57 to make pivotal rotation, so that its lower portion can swing and can make contact with the contacts of the position limiting miniature switches 10. Therefore, following the rotation of the base disk 54, and with each 360° rotation, the contact of one of miniature switches 10 will collide (run into) the ledge 511 to make the second motor 53 rotate in reverse direction, thereby the continuous reversible reciprocating rotation of 360° can be realized. In the use, a certain amount of rotation angle in the action of contact-actuating on the miniature switch by the positioning operation rod 57 is delayed with respect to the contact of the positioning operation rod 57 on the ledge 511 of the outer gear 51, the actual reversible angle of the base disk 54 can reach 365°.

The suction disk device 6 includes a suction disk 61, a crank type suction disk controlling rod 62, a supporting member 63 constituted by a base plate 65 and a control support 64 vertically mounted on the base plate 65. Among them, the control support 64 of the supporting member 63 is a channel-section (U-bar) shaped member having two identical height vertical walls, on the vertical walls, there is provided each a retaining hole 631. The two retaining holes 631 are opposite each to other and have a common axis. The crank type suction disk controlling rod 62 has a crank portion 621 located in the middle and a bended-curved like handle portion 622 located in the tail portion.

The supporting member 63 is fixed vertically on the center of the suction disk 61 through the base plate 65. The suction disk 61 is tightly mounted against the edge of the lower bottom opening of the base stand 4 and the supporting member 63 is made to be located within the base stand. The front end of the crank type suction disk controlling rod 62 can be inserted from the small hole 42 of the base stand 4 and pass the retaining holes 631 of the supporting member 63 to arrive at and to be positioned in the supporting hole 43, while the crank portion 621 is located between the retaining holes 631 and the handle portion 622 is located beyond the base stand 4.

In this manner, when the handle portion 622 is pushed upward, the suction disk 61 can be made to bend inward toward the inner hole of the base stand 4 and to be powerfully held on the plane of a deck of the ship, galley, trailers, utility vehicles etc through vacuum suction force by means of the vacuum sucker.

Except for the above-mentioned flash light circuit board 26, the receiving and controlling circuit boards further include an additional flash light circuit board 26', a main circuit board 46, a receiver PCB 66, and the control switch etc. They are respectively mounted in lamp receptacle 1 and the base disk 54 and they are connected to the controller (not shown I Figures.) via cables. The controller provides to users with free control and actuation in the range of 10 meters by using wireless remote such as infra red (IR) or radio frequency (RF) control.

What is claimed is:

1. A remote control combined signal light and spotlight, comprising:
   a lamp receptacle (1) including a base portion (11) and two supporting portions (12) mounted vertically on the bottom of the base portion (11), said supporting portions (12) are hollow pillars and the upper portions thereof are provided with a shaft hole (13) respectively;
   a combined light (2) including a signal light (21), a spotlight (22), a front lamp shield (23), a rear lamp shield (24), a lens (25), a circuit board for signal light (26) and two supporting shafts (27,28), among them, the front portion of the front lamp shield (23) and the rear portion of the rear lamp shield (24) are provided with an opening (231,241) respectively, in said openings (231,241) are mounted the lens (25) and the spotlight (22), behind the lens (25) are provided the signal light (21) and the circuit board (26) and the front lamp shield (23) and the rear lamp shield (24) can form an approximately spherical lamp body or light body by means of fasteners, the two supporting shafts (27,28) are fixed axial symmetrically on spherical lamp body faces adjacent to the abutted faces of the front lamp shield (23) and the rear lamp shield (24) and have a common axis, in addition, the combined light (2) can be rotatably mounted on the lamp receptacle (1) by the two supporting shafts (27,28);
   a driving device (3) for the upward and downward rotation of the combined light including a driven gear (31) mounted on one of the two supporting shafts (27,28) of the combined light (2) and located within the supporting portions (12), a first drive mechanism (32) mounted on the supporting portions (12), which is mounted on the inner wall of the supporting portions (12) and can connect and drive the driven gear (31) to make it rotate;
   a base stand (4) having a shape similar to an inverted bowl, on the central position thereof is provided a circular protruding platform (41), on the peripheral face of its middle portion are provided a small hole (42) and a supporting hole (43) at the radial opposite positions;
   a driving device (5) for the horizontal rotation of the combined light (2) including an outer gear (51), a second worm (52), a second motor (53) and a base disk (54), among them, in the base disk (54), a hollow round tube portion (541) extending upward from the bottom of the base disk is provided and the base disk is rotatably fitted onto the protruding platform (41) of the base stand (4) via the tube hole of the round tube portion (541), the outer gear (51) is fixed on the end face of the protruding platform (41) of the base stand (4), the motor (53) is mounted in the mounting portion (542) of the bottom portion of the base disk (54) and the second worm (52) is fixed on its driving shaft, and at the same time, the second worm (52) and the outer gear (51) can mesh each with other;
   receiving and controlling circuit boards respectively mounted in the lamp receptacle (1) and the base disk (54); and
   a suction disk device (6) mounted under the base stand (4).

2. The remote control combined signal light and spotlight as claimed in claim 1, characterized in that said first drive mechanism (32) includes a housing (33), a first gear (34), a last stage gear (35), several intermediate transmission gears (38), a first worm (36) and a first motor (37), among them, the housing (33) is composed of two channel-section shaped parts (331, 332) joined by facing each other and formed into a hollow chamber between them, on the upper portion of the inner wall of the housing (33) are provided several shaft holes to be used as supporting holes for mounting the last stage gears, first gear and intermediate transmission gears in place through gear shaft, while the first motor (37) is mounted on the lower portion of the inner wall, the first worm (36) is fixed on the drive shaft of the first motor (37) and disposed in such a manner that it can mesh with the first gear (34), while the last stage gear (35) meshes with the driven gear (31) of the supporting shaft of the combined light, and the intermediate transmission gears (38) mesh with the first gear (34) and the last stage gear (35).

3. The remote control combined signal light and spotlight according to claim 2, characterized in that, the number of gears of the first drive mechanism is four, except for the first gear (34) and the last stage gear (35), the intermediate gears are double linked gears composed of a large gear and a small gear, the small gear is arranged to mesh with the last stage gear (35), while the large gear meshes with the first gear (34).

4. The remote control combined signal light and spotlight according to claim 2 characterized in that the driving device (3) for the upward and downward rotation of the combined light (2) further includes a control mechanism for allowing the combined light to rotate upward and downward in a reciprocating manner, said control mechanism includes an elongated positioning operation rod (7) which is pivotably mounted on the outer wall of the housing (33), and two miniature limit switches or miniature switches (8) mounted on the housing (33) with a predetermined interval and a certain angle of inclination between each other and an up-down actuating means which can allow the lower portion of the positioning operation rod (7) to swing periodically to make contact with the contacts of the two miniature switches (8) and which can make the first motor (37) rotate upward and downward periodically in forward and reverse direction.

5. The remote control combined signal light and spotlight according to claim 4, characterized in that said up-down actuating means includes a radial ledge (311) disposed on the lateral plane of the first gear (34) and a protruding pillar (71) disposed on an upper rod face of the positioning operation rod (7), said protruding pillar (71) can insert into the housing through the opening (329) provided on the housing (33) and can act with the ledge (311) of the first gear (34) to push the positioning operation rod (7) to rotate pivotally thereby making the lower portion of the positioning operation rod (7) swing in a reciprocating manner and make contact periodically with the contacts of the two miniature switch (8).

6. The remote control combined signal light and spotlight according to claim 1, wherein the driving device (3) for the up-down rotation of the combined light (2) further includes an automatic extinguishing mechanism for the spotlight (22), said extinguishing mechanism is composed of an actuating member (15) mounted on the supporting shaft (27) and a switch (16) mounted on the inner wall of the supporting portion (12), said actuating member (15) includes a round sleeve (151) and a protruding portion (152) disposed on the outer peripheral face of the round sleeve (151), said actuating member (15) is fitted onto the supporting shaft (27) via the sleeve hole of the round sleeve (151) and rotates together with the supporting shaft (27), when said actuating member (15) rotates to a position where the light face of the spotlight (22) of the combined light (2) faces downward and forms a predetermined angle about 30° with the horizontal plane, the protruding portion (152) makes contact with the contact of the switch (16) to extinguish automatically the spotlight.

7. The remote control combined signal light and spotlight according to claim 1, characterized in that, the driving device (5) for the horizontal rotation of the combined light (2) further includes a control mechanism which can allow the combined light (2) to rotate in positive and reverse direction in 360°, the control mechanism includes limiting miniature switches (10) mounted on the bottom portion of the base disk (54) and positioned close to the outer gear (51) with a predetermined interval and a certain angle of inclination each to other, a positioning operation rod (57) mounted in a pivotable manner on the bottom portion of the base disk (54) and positioned between the two miniature switches (10), and a horizontal actuating means which can allow the lower portion of the positioning operation rod (57) to swing periodically, to make contact with the contacts of the two miniature switches (10) and to allow the second motor (53) to rotate in positive and reverse directions periodically.

8. The remote control combined signal light and spotlight according to claim 7, characterized in that, the horizontal actuating means includes a radial ledge (511) disposed below the face of the outer gear (51) and a protruding pillar (571) disposed vertically on the rod face of the upper portion of the positioning operation rod (57), the protruding pillar (571), when the rod (57) rotates together with the base disk (54), can act with the ledge (511) of the outer gear (51) to push the positioning operation rod (57) to pivot, thereby making its lower portion swing and allowing the rod (57) to make contact with the contacts of the two position miniature switches (10) periodically.

9. The remote control combined signal light and spotlight according to claim 1, characterized in that, the suction disk device (6) includes a suction disk (61), a crank shaft type controlling rod (62) and a supporting member (63) having a controlling support (64) and the base plate (65), among them, the controlling support (64) of the supporting members (63) is a channel bar shaped member having two vertical walls of identical height, a retaining hole (631) is provided on each vertical wall which holes are opposite each to other and have a common axis, the crank type controlling rod (62) has a crank portion (621) located in the middle and a bended and curved handle portion (622) in the tail end, the supporting member (63) is fixed vertically on the center portion of the suction disk (61) through the base plate (65), the suction disk (61) is mounted tightly against the edge of the lower bottom opening of the base stand (4) and makes the supporting member (63) positioned within the base stand (4), the front end of the crank type controlling rod (62) can be inserted in from the small hole (42) of the base stand (4) and pass through the retaining hole (631) of the supporting member (63) to arrive at and be positioned within the supporting hole (43) while making the crank portion (621) cut across the two retaining holes (631) of the supporting member (63) with the handle portion (622) being beyond the base stand (4).

10. The remote control combined signal light and spotlight according to claim 1, characterized in that, the up-down rotation angle of the combined light (2) is 250°.

11. The remote control combined signal light and spotlight according to claim 1, characterized in that, the front lamp shield (23) and rear lamp shield (24) of the combined light have each a semi-circular groove (232, 242) at the opposite mounting faces, when assembled together, they form two round mounting holes, thereby said supporting shafts (27,28) can be inserted into and fixed within the two mounting holes.

12. The remote control combined signal light and spotlight according to claim 2, characterized in that, said signal light (21) is a super bright xenon flash light bulb.

13. The remote control signal light and spotlight according to claim 1, wherein said spotlight is a super bright sealed light beam bulb.

* * * * *